United States Patent
Fujimoto

(10) Patent No.: US 8,077,637 B2
(45) Date of Patent: Dec. 13, 2011

(54) MOBILE COMMUNICATION APPARATUS

(75) Inventor: Toshifumi Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 843 days.

(21) Appl. No.: 12/003,292

(22) Filed: Dec. 21, 2007

(65) Prior Publication Data

US 2008/0176591 A1 Jul. 24, 2008

(30) Foreign Application Priority Data

Dec. 26, 2006 (JP) ................................ 2006-350200

(51) Int. Cl.
*H04B 7/005* (2006.01)
(52) U.S. Cl. ....................................... 370/278
(58) Field of Classification Search ........................ None
See application file for complete search history.

(56) References Cited

U.S. PATENT DOCUMENTS

| | | | |
|---|---|---|---|
| 5,983,383 | A | 11/1999 | Wolf |
| 7,054,316 | B2 | 5/2006 | Cheng et al. |
| 2001/0036234 | A1 | 11/2001 | Lundby |
| 2003/0153276 | A1* | 8/2003 | Terry et al. ........................ 455/69 |
| 2005/0105499 | A1 | 5/2005 | Shinozaki et al. |
| 2005/0259643 | A1* | 11/2005 | Chuah et al. .................... 370/389 |
| 2006/0034399 | A1* | 2/2006 | Murao ............................. 375/341 |
| 2006/0092972 | A1 | 5/2006 | Petrovic et al. |
| 2006/0092973 | A1 | 5/2006 | Petrovic et al. |

FOREIGN PATENT DOCUMENTS

| | | |
|---|---|---|
| JP | 2001511963 A | 8/2001 |
| JP | 2003115892 A | 4/2003 |
| JP | 2003163960 A | 6/2003 |
| JP | 2003520462 A | 7/2003 |
| JP | 2004-530364 | 9/2004 |
| JP | 2005-151013 | 6/2005 |
| JP | 2005-536159 | 11/2005 |
| JP | 2005-536160 | 11/2005 |

OTHER PUBLICATIONS

Japanese Office Action dated Aug. 2, 2011 for application No. 2006-350200.
3GPP TSGR1#17(00)1382 " Asynchronous and Adaptive Incremental Redundancy ($A^2IR$) Proposal for HSDPA"; Lucent Technologies; Nov. 21-24, 2000, Sweden.

* cited by examiner

*Primary Examiner* — Chirag Shah
*Assistant Examiner* — Otis L Thompson, Jr.
(74) *Attorney, Agent, or Firm* — Murphy & King, P.C.

(57) ABSTRACT

A mobile communication apparatus on the receiving side receives and stores data being transmitted over the period of a plurality of processing time units, from the mobile communication apparatus on the transmitting side. At the time of retransmission of the data concerned, the mobile communication apparatus includes a retransmission control function which performs composition processing of the stored data with the data retransmitted over the period of a plurality of processing time units. The mobile communication apparatus executes reception decision processing for deciding the presence or non-presence of reception error in the data on which composition processing is performed in each processing time unit, and notifies the transmitting-side apparatus of the reception decision result concerned, on the basis of each processing time unit.

7 Claims, 6 Drawing Sheets

MOBILE COMMUNICATION APPARATUS

CROSS-REFERENCE TO RELATED APPLICATIONS

This application is based upon and claims the benefit of priority from the prior Japanese Patent Application No. 2006-350200, filed on Dec. 26, 2006, the entire contents of which are incorporated herein by reference.

BACKGROUND OF THE INVENTION

1. Field of the Invention

The present invention relates to mobile communication apparatus having a packet data retransmission control function, and more particularly, mobile communication apparatus performing packet composition processing at the time of retransmission control, for composing a retransmitted packet data with a packet data already received and stored.

2. Description of the Related Art

In order to cope with mobile multimedia services, such as Internet connection, high-speed data communication is required in the mobile communication system. Retransmission control is used as a means for efficiently transmitting packet data for high-speed data communication. The retransmission control (ARQ: Automatic Repeat Request) is a technique in which, when an error is detected in a packet received on a receiving side, a transmitting side is requested to transmit the packet of interest again.

Moreover, the hybrid ARQ (H-ARQ) has been put into practical use, in which an error correction code (FEC: Forward Error Correction) is combined with ARQ. Presently, a W-CDMA system is widely used as a third-generation (3G) radio communication system, and for example, H-ARQ is adopted in HSDPA (High-speed Downlink Packet Access) for increasing data communication speed (14 Mbps maximum) in the above W-CDMA.

In H-ARQ, error correction processing is performed prior to error detection on the receiving side, and when it is decided the reception is successful (no existence of error), ACK (normal decision) is transmitted to the transmitting side, while when the reception is decided to be unsuccessful (existence of error), NACK (abnormal decision) is transmitted to the transmitting side, so as to request to retransmit the packet data. The transmitting side then retransmits the packet data corresponding to the received NACK.

Further, in H-ARQ, packet composition processing is performed, in which the receiving side stores in a buffer a packet data having a detected error, so as to compose with the retransmitted packet data. By composing with the packet data stored in the buffer when the retransmitted packet data is received, reception quality is improved. As the number of times of retransmission increases, the degree of improvement increases, and a success rate of packet data reception increases.

FIG. 1 shows a diagram explaining the conventional retransmission control. The retransmission processing on the transmitting side and the receiving side of each mobile communication apparatus set is performed on the basis of a data length equal to a plurality (n>2) of TTIs (Transmission Time Intervals) (for example, 4 TTIs in FIG. 1), and decoding processing, reception decision processing, retransmission request (notification of ACK/NACK), etc. are performed on the basis of each data length of the transmitted data.

Now, let one radio frame (basic unit for transmitting/receiving packet data in each set of mobile communication apparatus) to be 1 TTI (Transmission Time Interval: transmission time of a minimum unit assigned to each user), then the retransmission processing is performed on the basis of each data length of n TTIs). Additionally, RTT (Round Trip Time) is defined to be a time from when the transmitting side transmits the packet data of the last TTI among the packet data ranging over the period of a plurality of TTIs, to when a reception decision result (ACK/NACK) is received from the receiving side. The RTT in FIG. 1 is 6 radio frames=6 TTIs.

In FIG. 1, a data of 4 TTIs is transmitted from the transmitting side. On the receiving side, whenever the data of each TTI is received, the received data is stored in a retransmission composition buffer on the basis of each TTI. For example, as shown in the figure, first, the receiving side stores a first TTI data #1-1 in the data #1 of 4 TTIs, and next, stores a second TTI data #1-2, and subsequently, stores a third TTI data #1-3, and finally, stores a fourth TTI data #1-4. In the TTI period next to the period of storing the fourth TTI data #1-4, the receiving side obtains a decoding parameter from the header (H in the figure) added to the first data #1-1, and performs decoding processing, error correction processing, and then reception decision, in regard to the data #1 for 4 TTIs. Further, in the next TTI, the receiving side notifies the transmitting side of the above decision result.

At this time, as shown in the figure, if an error is detected in the first TTI data #1-1, and NACK (reception failure) is reported as the reception decision result, the transmitting side retransmits data #1 of 4 TTIs, in response to the above NACK reception.

Each time the data of 1 TTI is received, the receiving side performs composition processing of the received data with the data already stored in the retransmission composition buffer, and stores the composed data into the retransmission composition buffer. By the above composition processing repeated four times, the retransmission data is stored as a composed data, and in regard to the above composed data, the decoding processing, the error correction processing and the reception decision processing are performed again. In the case shown in FIG. 1, when ACK (reception successful) is reported as a reception decision result, the transmitting side is shifted to transmit the next data #2.

Data retransmission control in the mobile communication has been described in the official gazette of the Japanese Unexamined Patent Publication No. 2005-151013, as an example.

Now, as described above, when one time data transmission/reception requires the plurality of TTIs (that is, the data length ranges over the plurality of TTIs), and when the retransmission control is performed by executing the reception decision after the data reception of the plurality of TTIs, the following problem occurs.

Namely, even when an error is detected in only one TTI data among the plurality of TTIs (in FIG. 1, error is detected only in the first data #1-1), it is necessary to retransmit the entire data of the plurality of TTIs, and thus, without exception, the data having no detected error is transmitted in duplication, which impedes effective use of radio resources.

Further, on the receiving side, because the reception decision processing is not performed until the entire data of the plurality of TTIs are received, the time from when the last TTI is transmitted to when the reception decision result is received on the transmitting side (i.e. RTT) becomes long. In other words, an idle time of no data transmission becomes long, and a long time is required for retransmission.

SUMMARY OF THE INVENTION

Accordingly, it is an object of the present invention to provide a mobile communication apparatus capable of reducing a retransmission processing time, so as to perform efficient retransmission processing.

In order to achieve the aforementioned object, a mobile communication apparatus receiving and storing data transmitted from an apparatus on the transmitting side over the period of a plurality of processing time units, and at the time of retransmitting the data, having a retransmission control function of performing composition processing of the stored data with the data being retransmitted over the period of a plurality of processing time units, on the basis of each the processing time unit, the mobile communication apparatus on the receiving side according to the present invention includes: a reception decision section executing reception decision processing for deciding the presence or non-presence of reception error in the data on which composition processing is performed on the basis of each the processing time unit; and a transmission section notifying the apparatus on the transmitting side of the reception decision result, on the basis of each the processing time unit.

Further, in order to achieve the aforementioned object, a mobile communication apparatus transmitting data to an apparatus on the receiving side over the period of a plurality of processing time units, and having a retransmission control function of retransmitting the data based on a reception decision result from the apparatus on the receiving side, the mobile communication apparatus on the transmitting side according to the present invention includes: a reception section receiving the reception decision result for each processing time unit from the apparatus on the receiving side; and a retransmission control section retransmitting the data when the entire reception decision results in regard to the data are abnormal decisions indicative of the presence of errors.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings. However, it is noted that the embodiments described below are not intended to limit the technical scope of the present invention.

Figure 2:
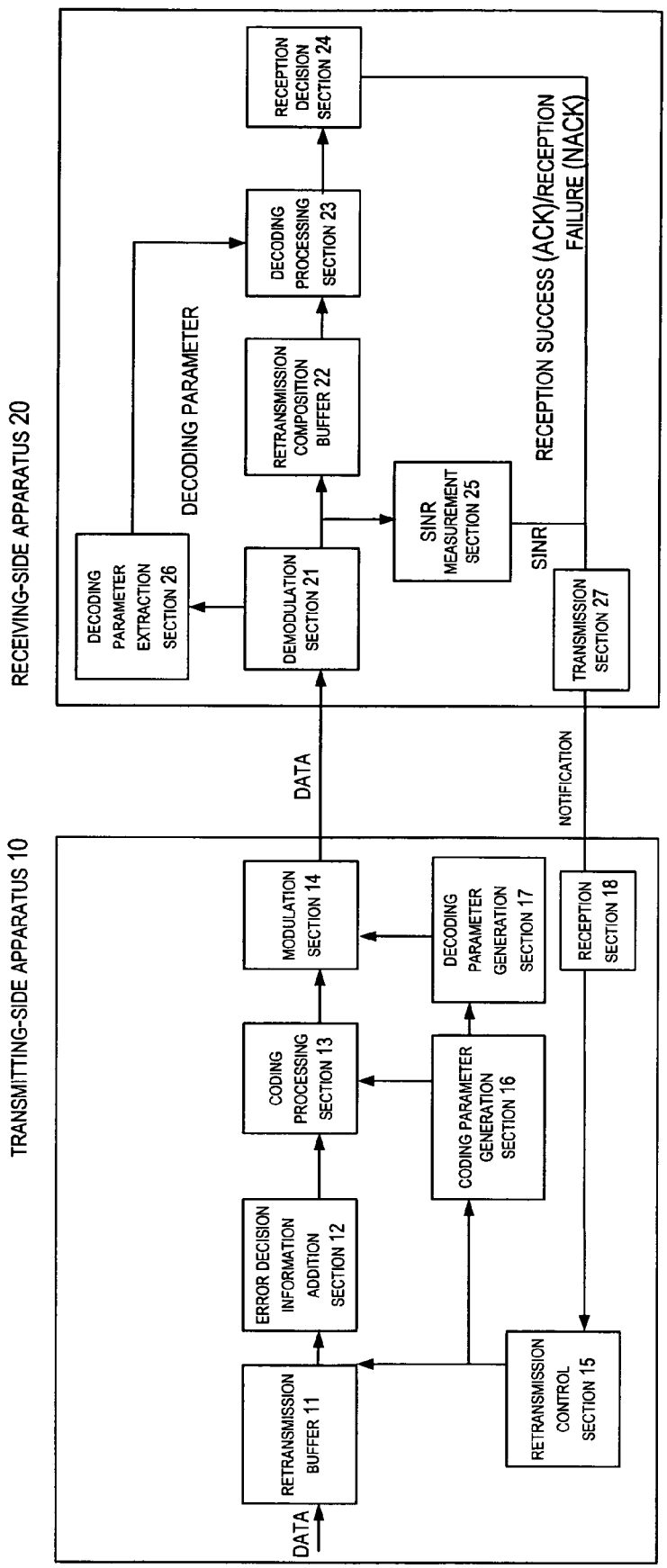
FIG. 2 shows a diagram illustrating an exemplary configuration of a mobile communication system, according to an embodiment of the present invention.

FIG. 2 shows a diagram illustrating an exemplary configuration of a mobile communication system, according to an embodiment of the present invention. The mobile communication system includes mobile communication apparatus on the transmitting side and mobile communication apparatus on the receiving side, and the mobile communication apparatus includes a mobile unit and radio base station apparatus in the mobile communication system. In the case of uplink communication from the mobile unit to the radio base station apparatus, the mobile unit becomes mobile communication apparatus 10 on the transmitting side (hereafter, transmitting-side apparatus), while the radio base station apparatus becomes mobile communication apparatus 20 on the receiving side (hereafter, receiving side apparatus). Also, in the case of downlink communication from the radio base station apparatus to the mobile unit, the radio base station apparatus becomes transmitting-side apparatus 10, while the mobile unit becomes receiving-side apparatus 20. Hereafter, since the communication direction is not distinguished, the description is given, as the mobile unit and the radio base station apparatus are one and the other of transmitting-side apparatus 10 and receiving-side apparatus 20, respectively.

In transmitting-side apparatus 10, a retransmission buffer 11 is a buffer for storing data to be transmitted, and the data concerned is stored therein even after the data is transmitted, until an ACK of the data concerned is received from receiving-side apparatus 20. An error decision information addition section 12 adds error decision information, such as CRC, to the data. Further, a coding processing section 13 encodes the data using a coding parameter including an error correction code (FEC). The coding parameter including the error correction code is supplied from a coding parameter generation section 16. A modulation section 14 modulates the coded data, so as to transmit. A retransmission control section 15 performs storage control of the data in retransmission buffer 11, based on the ACK/NACK from receiving-side apparatus 20, and also controls the above coding parameter generation section 16. A decoding parameter generation section 17 obtains the coding parameter from coding parameter generation section 16, and generates a decoding parameter corresponding to the coding parameter. Further, modulation section 14 transmits data after adding the decoding parameter. From receiving-side apparatus 20, a reception section 18 receives an ACK/NACK and an SINR (Signal Noise Ratio) in regard to the received data.

On receipt of the data from transmitting-side apparatus 10, a modulation section 21 in receiving-side apparatus 20 demodulates the data, and a decoding parameter extraction section 26 extracts the decoding parameter added to the data, so as to supply to a decoding processing section 23. Further, an SINR (Signal Noise Ratio) measurement section 25 measures the SINR of the received data. The demodulated data is stored in a retransmission composition buffer 22, and decoding processing section 23 performs error correction on the data stored in retransmission composition buffer 22, and then decodes the data. Based on error decision information, a reception decision section 24 performs reception decision whether or not error is included in the decoded data. When error is included, reception decision section 24 decides the reception failed, and a transmission section 27 transmits a NACK to transmitting-side apparatus 10. Meanwhile, when error is not included, the reception is decided to be successful, and transmission section 27 transmits an ACK to transmitting-side apparatus 10. Transmission section 27 transmits the SINR, measured in SINR measurement section 27, to transmitting-side apparatus 10.

At this time, as described in the prior arts, when one time data transmission/reception is performed over the period of a plurality of TTIs, conventionally, the data ranging over the period of the plurality of TTIs are entirely received and stored in retransmission composition buffer 22, and thereafter, decoding processing and reception decision are performed for the above data ranging over the period of the plurality of TTIs. In contrast, according to the embodiment of the present invention, decoding processing section 23 in receiving-side apparatus 20 performs data decoding processing in regard to the received data on the basis of each TTI, i.e. each processing time unit, and reception decision section 24 performs reception decision on the basis of each TTI, and transmits an ACK/NACK on the basis of each TTI, as a feature of the present invention. In the following, more detailed description will be given.

Figure 1:
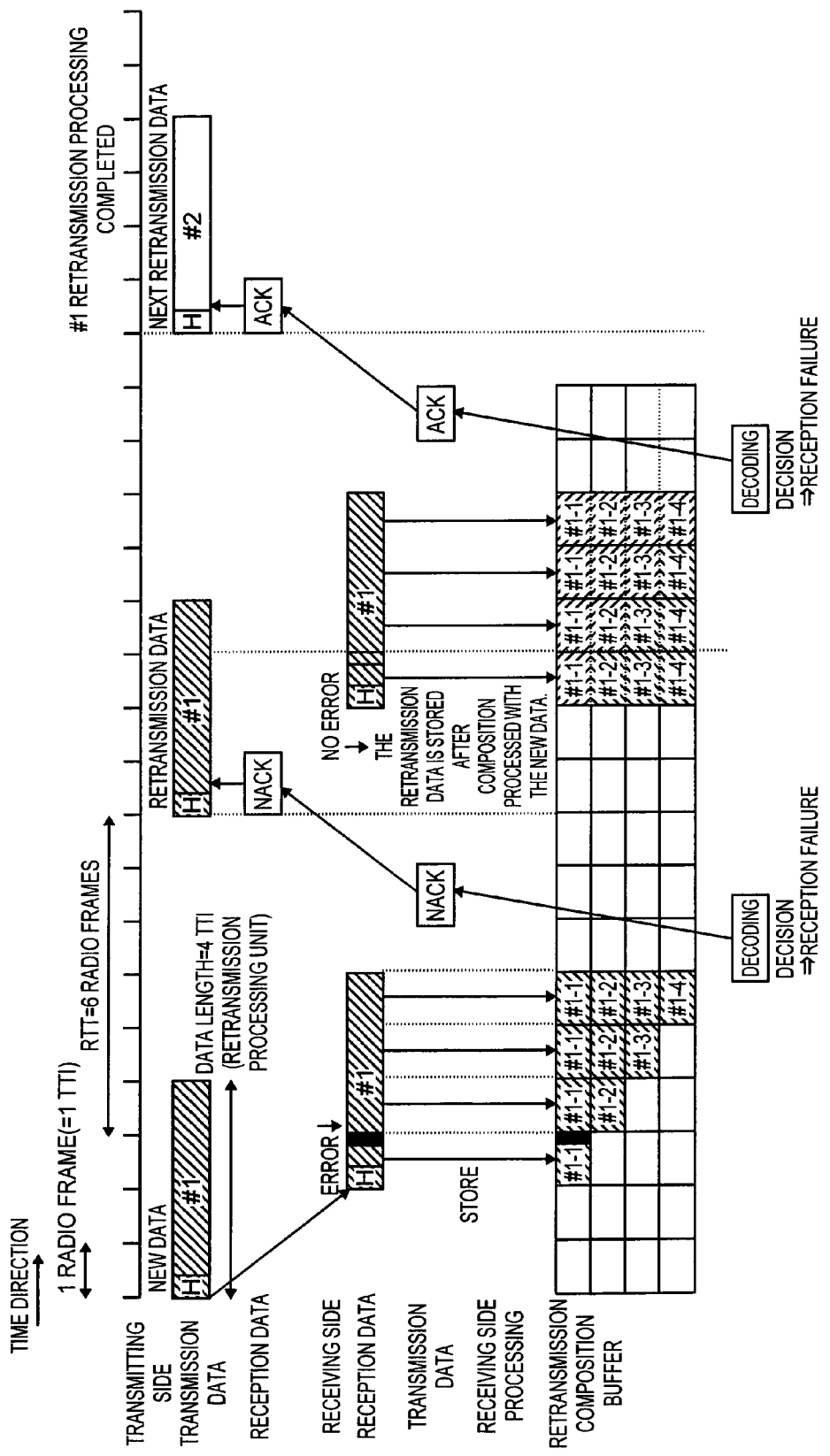
FIG. 1 shows a diagram explaining the conventional retransmission control.
Figure 3:
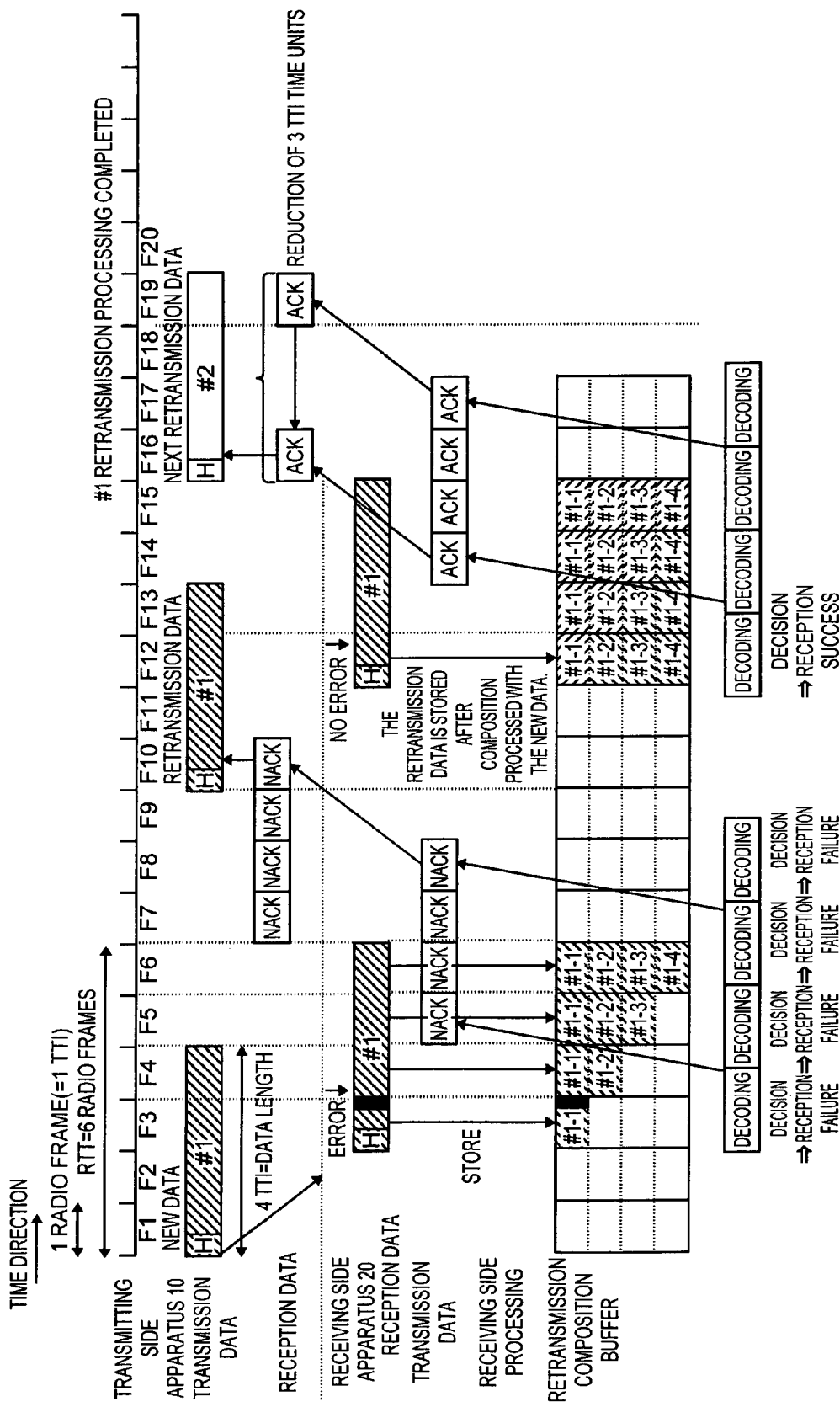
FIG. 3 shows a diagram explaining first retransmission processing according to an embodiment of the present invention.

FIG. 3 shows a diagram explaining first retransmission processing according to an embodiment of the present invention. In FIG. 3, similar to FIG. 1, one radio frame is defined as one TTI, and one time transmission/reception is performed during the time of 4 TTIs. Also, the RTT is 6 radio frames=6 TTIs. Here, according to the present invention, because decoding processing, reception decision and ACK/NACK transmission are performed on the basis of each TTI, the RTT, which is a period from when the data of each TTI is transmitted to when the ACK/NACK corresponding to the data concerned is received, is 6 TTIs, similarly to the case of FIG. 1.

In FIG. 3, the data is transmitted from transmitting-side apparatus 10 by consuming the time of 4 TTIs. The data transmitted from transmitting-side apparatus 10 is received in receiving-side apparatus 20 after 2 TTIs (=2 radio frames). Whenever the data of each TTI is received, receiving-side apparatus 20 stores the received data into retransmission composition buffer 22 on the basis of each TTI. For example, as shown in the figure, first, in a radio frame F3, a data #1-1 of the first TTI among the data #1 for 4 TTIs is stored, and in the next radio frame F4, a data #1-2 of the second TTI is stored, and subsequently, a data #1-3 of the third TTI is stored, and finally, a data #1-4 of the fourth TTI is stored.

Then, decoding processing section 23 in receiving-side apparatus 20 according to the present invention performs decoding processing on a TTI basis. Namely, without waiting for the final TTI data #1-4, the first TTI data #1-1 is received in the radio frame F3, and when the above received data is stored in retransmission composition buffer 22, decoding processing section 23 performs decoding processing to the data stored in retransmission composition buffer 22 in the next radio frame F4. Additionally, in the above next radio frame period F4, the second TTI data #1-2 is received and stored in retransmission composition buffer 22, while the data on which decoding processing is performed is the data which has been stored in retransmission composition buffer 22 at the time point of the preceding radio frame F3. In this case, in the radio frame F3, only the data #1-1 is stored in retransmission composition buffer 22 but the data for 4 TTIs are not stored yet. Therefore, the decoding fails, and reception decision section 24 decides the reception fails, and in the next radio frame period F5, a NACK is transmitted to transmitting-side apparatus 10. After the lapse of 2 TTIs (=2 radio frames), the ACK/NACK transmitted from receiving-side apparatus 20 is received in reception section 18 of transmitting-side apparatus 10.

Similarly, in the radio frame F5 also, because decoding processing section 23 performs decoding processing on the data #1-1 and #1-2 stored in retransmission composition buffer 22 (the data #1-3 and #1-4 are not received yet), the decoding fails, and the reception decision section 24 decides the reception failed, and accordingly, transmission section 27 in receiving-side apparatus 20 transmits a NACK to transmitting-side apparatus 10. Further, in a radio frame F6 also, because decoding processing section 23 performs decoding processing on the data #1-1, #1-2 and #1-3 stored in retransmission composition buffer 22 (the data #1-4 is not received yet), the decoding fails, and the reception decision section 24 decides the reception failed, and transmission section 27 transmits a NACK to transmitting-side apparatus 10.

The data for 4 TTIs are stored in retransmission composition buffer 22 in the radio frame period F6, and in a radio frame period F7, the decoding processing is performed on the data for 4 TTIs, #1-1 to #1-4. However, in the example shown in FIG. 3, an error which is not correctable is included in the data #1-1, and the decoding fails accordingly. As a result, reception decision section 24 decides the reception failed, and transmission section 27 transmits a NACK to transmitting-side apparatus 20. The data stored in retransmission composition buffer 22 is kept stored, and not erased until an ACK is transmitted. It is assumed no error is included in the data #1-2 to #1-4.

After transmitting data, transmitting-side apparatus 10 supervises an ACK/NACK to be received after the lapse of an RTT. On receipt of a NACK in a radio frame F10 as a reception decision result in regard to the decoding processing for the entire data for 4 TTIs, transmitting-side apparatus 10 starts retransmission of the data #1-1.

In a radio frame F12, receiving-side apparatus 20 receives the first TTI data #1-1 among the retransmitted data, so as to store into retransmission composition buffer 22. Namely, the data #1-1 stored in the radio frame F3 is composed with the retransmitted data #1-1. At this time, it is assumed that the retransmitted data #1-1 includes no error. Accordingly, no error is included in the composed data #1-1.

Decoding processing section 23 performs decoding processing in a radio frame F13. As to the retransmitted data, only the data #1-1 has been received yet. However, in retransmission composition buffer 22, the data #1-2 to #1-4 of the first transmission have been stored. Therefore, it is possible to perform decoding processing on the data for 4 TTIs, constituted of the data #1-1 to #1-4, at the timing of the radio frame F13. Because no error is included in any data, reception decision section 24 decides the reception is successful, and transmits an ACK in a radio frame F14 accordingly. With this, at the timing of a radio frame F16, transmitting-side apparatus 10 can recognize that the data #1-1 has been received successfully, and therefore, it becomes possible to transmit the subsequent data #2.

Also, in regard to the data #1-2 to #1-4 of the retransmission data, composition processing is performed and the data concerned are stored in retransmission composition buffer 22, and decoding processing is performed in the radio frames F14, F15 and F16, and ACKs are transmitted.

Conventionally, the data #1-4 of the retransmission data is received in the radio frame F15, stored in retransmission composition buffer 22, and decoding processing is performed in the radio frame F16, which is then decided that the data reception is successful, and an ACK is transmitted in a radio frame F17, and accordingly, transmitting-side apparatus 10 recognizes the successful reception of the data #1 at the timing of a radio frame F19. In contrast, according to the embodiment of the present invention shown in FIG. 3, instead of performing decoding processing after receiving the entire retransmission data ranging over the period of the plurality of TTIs, the decoding processing is performed on the basis of each TTI. Therefore, transmitting-side apparatus 10 can receive the ACK in the radio frame F16, and a time reduction equivalent to 3 TTIs can be attained. Transmitting-side apparatus 10 can start transmission of the next data #2, from the radio frame F16 in which the ACK is received.

As such, according to the present invention, the decision of successful reception in the retransmission can be performed earlier, and transmitting-side apparatus 10 can be informed of the ACK earlier. Thus, reduction in retransmission processing time can be attained. While transmitting-side apparatus 10 cannot transmit the next data before receiving the decision of successful reception by the retransmission, in transmitting-side apparatus 10 according to the present invention, the period of waiting for the retransmission result is reduced, and thus, efficient use of radio resources becomes possible.

In the example shown in FIG. 3, when errors are included in the data #1-2 and #1-3 of the first transmission, the retransmission processing time can be reduced, as compared with the conventional case. Meanwhile, in case that an error is included in the last data #1-4, the retransmission processing time is the same as in the conventional case. However, when error is included in the data except for the last TTI, the reduction in the retransmission processing time can be realized.

Figure 4:
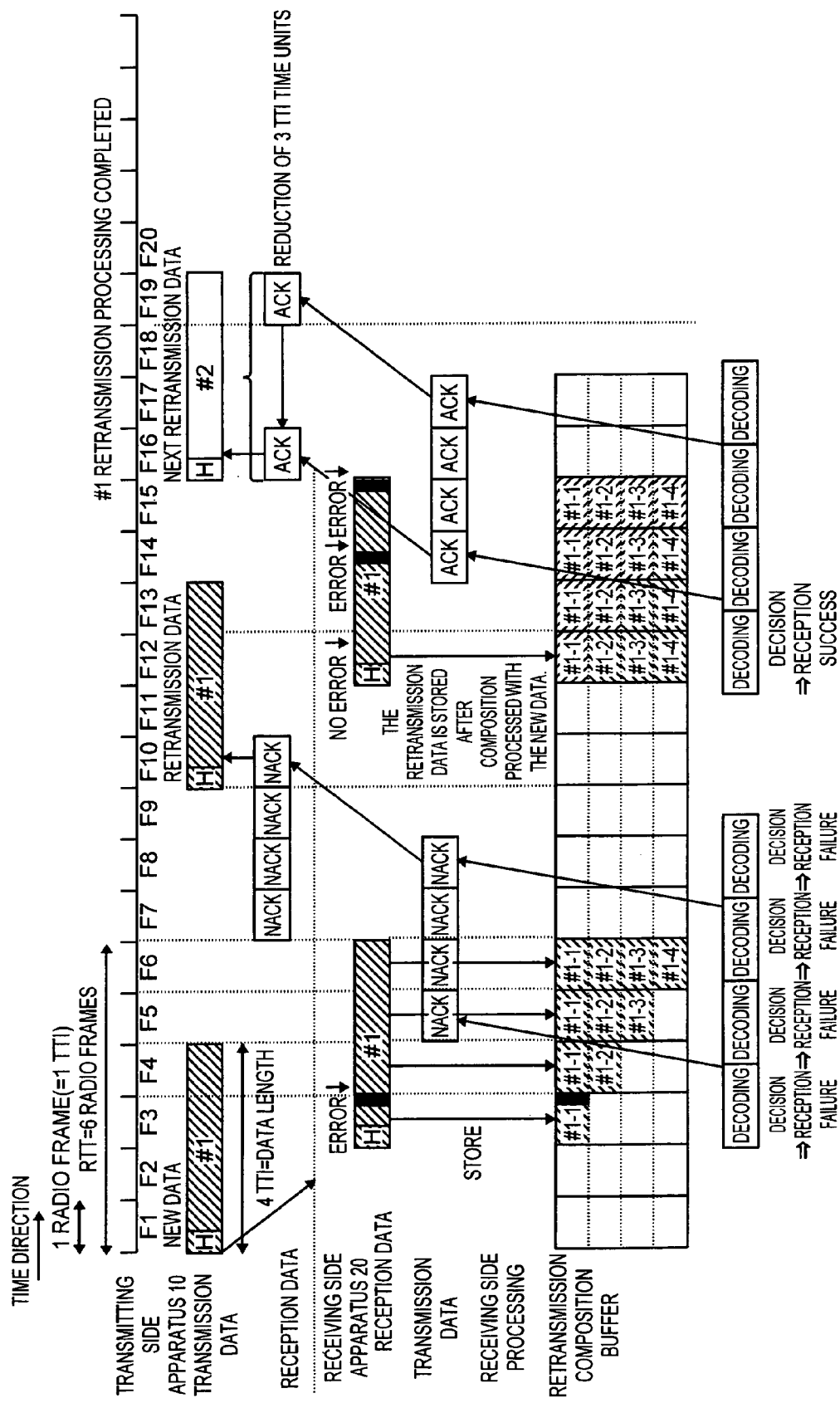
FIG. 4 shows a diagram explaining another example of the first retransmission processing.

FIG. 4 shows a diagram explaining another example of the first retransmission processing. In FIG. 4, there is shown a case that error is included also in the retransmitted data, and specifically, a case that errors are included in the data #1-3 and #1-4, other than the data (#1-1) having an error in the first transmission.

Also in the above case, as to the data #1-3 and #1-4, normal data having no error in the first transmission have been received and stored. Therefore, successful reception is decided on receiving the retransmitted data #1-1 having no error, and performing decoding processing after the composition processing thereof. Accordingly, as to the data having no error in the first transmission, an ACK can be transmitted even if error is included in the retransmission. Needless to say, if error is also included in the retransmission of the data having error in the first transmission, a reception failure is decided after the composition processing of the retransmitted data, and therefore, retransmission processing on the data concerned is repeated until the data having no error is received.

Figure 5:
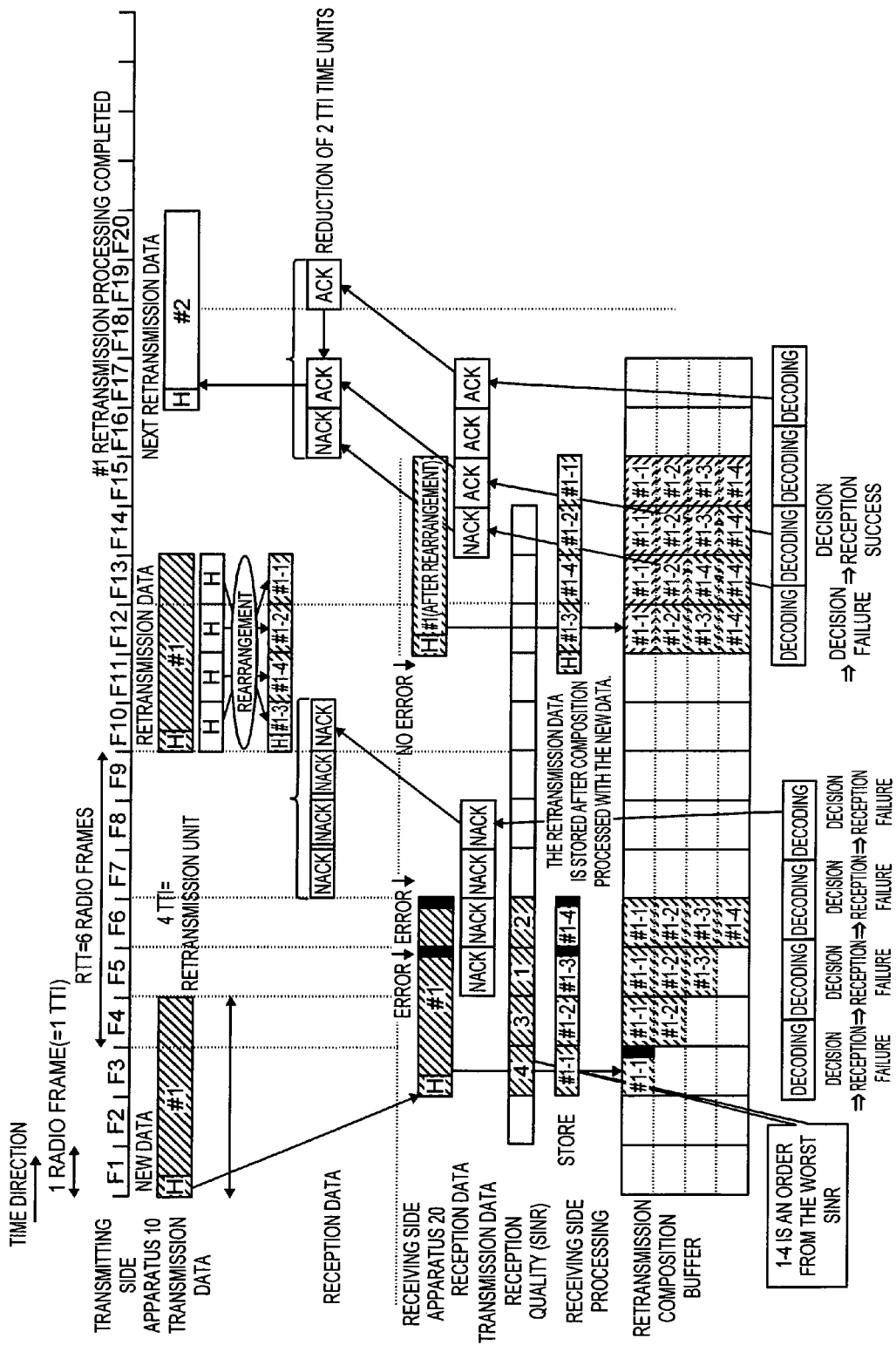
FIG. 5 shows a diagram explaining second retransmission processing according to an embodiment of the present invention.

FIG. 5 shows a diagram explaining second retransmission processing according to an embodiment of the present invention. The second retransmission processing shown in FIG. 5 performs the processing of rearranging a retransmission sequence by transmitting-side apparatus 10, based on the SINR of the received data being measured in SINR measurement section 25 of receiving-side apparatus 20, in the first retransmission processing shown in FIG. 3.

In FIG. 5 also, similar to the case of FIG. 3, one radio frame is defined as 1 TTI, and one transmission/reception is performed in the time of 4 TTIs. Also, the RTT is 6 radio frames=6 TTIs. Further, it is assumed that, in the first transmission, errors are included in the data #1-3 and #1-4. Accordingly, the decoding processing for each TTI in the first transmission of the radio frames F4-F7 fails, and NACKs are transmitted, and thus, the data #1 is retransmitted.

At this time, by the SINR measured in receiving-side apparatus 20, the retransmitted data is rearranged in order from the lowest reception quality, and then transmitted.

Data including error has low reception quality. In other words, the worse the SINR is, the higher the possibility of including error is. When measuring the SINR of the data of each TTI, SINR measurement section 25 in receiving-side apparatus 20 informs transmitting-side apparatus 10 of the measured value, and retransmission control section 15 in transmitting-side apparatus 10 retains the above value. Thereafter, on receiving NACKs in regard to the entire data (#1-1 to #1-4) of each TTI from receiving-side apparatus 20, retransmission control section 15 in transmitting-side apparatus 10 retransmits the data #1-1 to #1-4. At that time, by referring to the retained SINR, retransmission control section 15 in transmitting-side apparatus 10 determines the retransmission sequence of the data #1-1 to #1-4 to be retransmitted. Specifically, the retransmission sequence is in order from the worst SINR, which is the order from #1-3 to #1-4, #1-2 and #1-1 in the example shown in FIG. 5. In the example shown in FIG. 5, since errors are included in #1-3 and #1-4, the SINRs thereof are worse than the SINRs of the data #1-1 and #1-2 having no error.

Transmitting-side apparatus 10 retransmits the data of each TTI according to the retransmission sequence determined on the basis of the SINR. Since the retransmission sequence is changed, it is necessary for receiving-side apparatus 20 to identify the received data of each TTI, so as to perform composition processing with the corresponding data. Therefore, transmitting-side apparatus 10 transmits information related to the retransmission sequence, by including the above information in the header of the data to be retransmitted.

In the example shown in FIG. 5, receiving-side apparatus 20 receives the first data #1-3 of each TTI in the retransmission in a radio frame F12, and performs composition processing with the data #1-3 having already been stored, so as to store into the retransmission composition buffer. The retransmitted data #1-3 has no error, and therefore the data #1-3 on which composition processing is performed has no error. However, in the decoding processing performed in a radio frame F13, because the error in the data #1-4 is not dissolved, the decoding fails, and accordingly, a NACK is transmitted in a radio frame F14.

Subsequently, in the radio frame F13, receiving-side apparatus 20 receives data #1-4 of each TTI, and composes with the data #1-4 having already been stored, so as to store into retransmission composition buffer 22. The retransmitted data #1-4 includes no error, and therefore the data #1-4 on which composition processing is performed has no error. Thus, because no error is included in the entire data of each TTI, in the decoding processing performed in the radio frame F14, the decoding is successful, and accordingly, an ACK is transmitted in a radio frame F15.

Transmitting-side apparatus 10 receives the ACK in a radio frame F17, and therefore can start transmission of the next data #2 from the above timing. If the retransmission sequence is not rearranged, and when error is included in the last data of each TTI, such as the data #1-4 shown in FIG. 3, even though the decoding processing and the reception decision are executed on a TTI basis, the successful reception decision is not made before the entire retransmission data are received, and therefore, the retransmission processing time is not reduced. However, in the example of the second retransmission processing, because the data are retransmitted successively from the data having high possibility of error inclusion, even when the last data of each TTI has an error, the retransmission processing time can be reduced.

Figure 6:
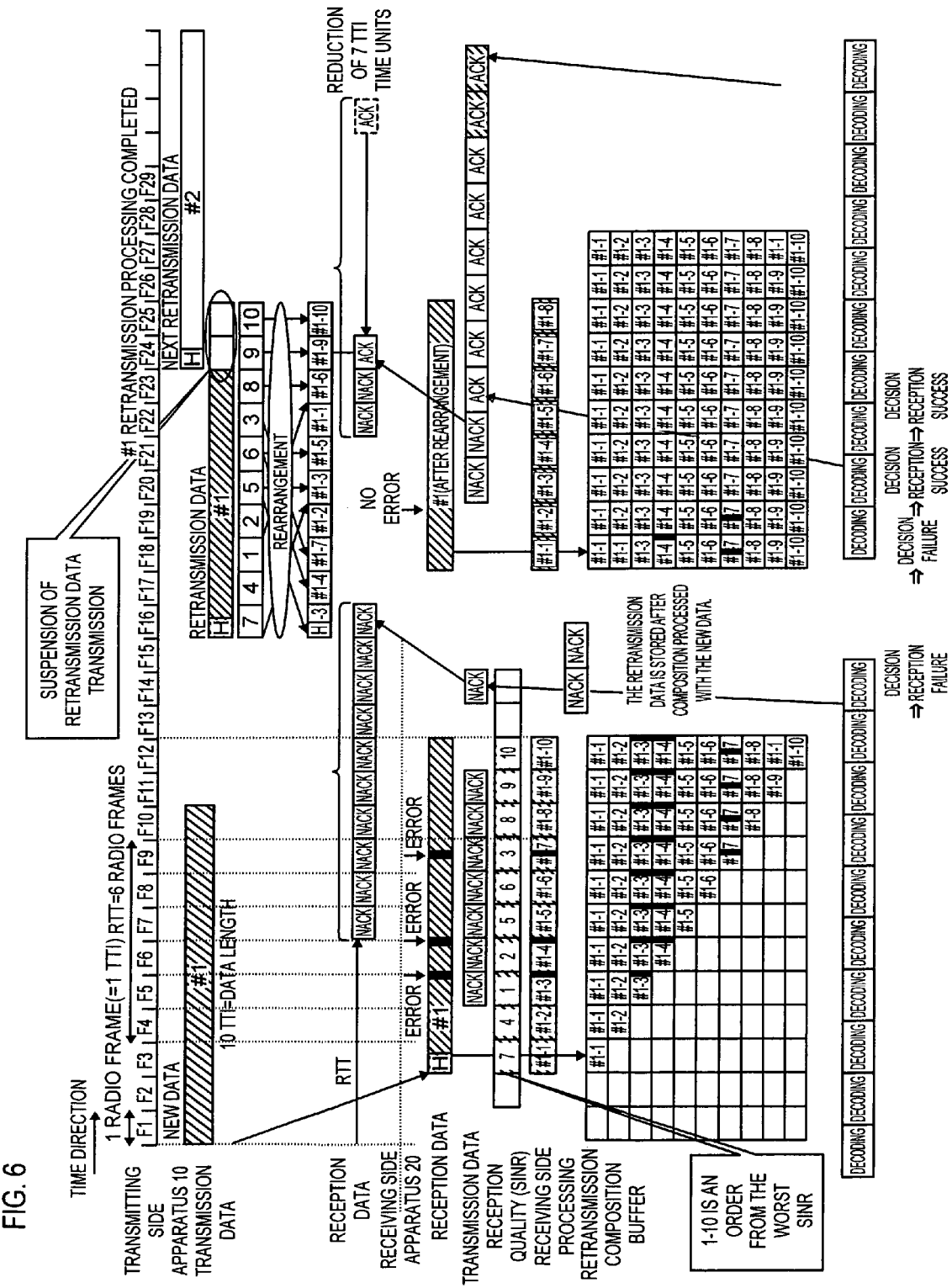
FIG. 6 shows a diagram explaining third retransmission processing according to an embodiment of the present invention.

FIG. 6 shows a diagram explaining third retransmission processing according to an embodiment of the present invention. In the first and the second retransmission processing illustrated in FIG. 3 and FIG. 5, there is shown a case that RTT=6 (the time from when the data of each TTI is transmitted to when an ACK/NACK corresponding thereto is received) is longer than the number of data in one data transmission/reception n (TTI length)=4. To the contrary, in case of RTT<n, an ACK may possibly be received during the transmission of the retransmitted data.

In FIG. 6, in case that the TTIs of one data transmission/reception=10, while RTT=6, in a radio frame F24, transmitting-side apparatus 10 receives an ACK before the entire retransmission data are completely transmitted. In the example shown in FIG. 5, errors are included in the data #1-3, #1-4 and #1-7 in the first transmission. By rearranging the retransmission sequence by means of the SINR decision described in the second retransmission processing, and by transmitting such the data having errors in the first transmission earlier than the others, a reception success decision is made in the decoding processing in a radio frame F21. As a result, transmitting-side apparatus 10 receives the ACK before the retransmission of the data #1-9 and #1-10.

On receiving the ACK, transmitting-side apparatus 10 suspends the transmission of the retransmission data even when the retransmission data is left, and starts transmitting the next data. By receiving the ACK, the transmission of the remaining retransmission data becomes unnecessary, and by suspending the transmission of the remaining retransmission data and by transmitting the next data, the retransmission processing time can be reduced, and efficient use of radio resources can be attained.

By receiving the retransmission data and performing composition processing of the retransmission data even after the ACK reception, further improvement of data quality not including error may be obtained. However, excessive quality can be prevented by suspending the transmission of the retransmission data half way so as to reduce the retransmission processing time.

In the third retransmission processing, it is not inevitably necessary for transmitting-side apparatus 10 to rearrange the retransmission sequence. In the first transmission, when error is included in the data of which transmission sequence is earlier (for example, #1-1, #1-2, etc.), at the time of retransmission, even when the retransmission is performed in the same order as the first transmission, transmitting-side apparatus 10 receives an ACK in the middle of the retransmission, as shown in FIG. 6. Therefore, by suspending the retransmission after the ACK reception, the retransmission processing time can be reduced.

In the aforementioned first, second and third processing, there have been shown examples in which the decoding processing and the reception decision processing are performed on a TTI basis whenever the data of each TTI is received, and even after the reception success decision, the reception decision is made based on the received retransmission data of each TTI. However, once the reception success decision is made, it may be possible to omit the composition processing, the decoding processing and the reception decision processing on the received retransmission data of each TTI.

Also, in the first, the second and the third processing, the decoding processing and the reception decision processing are performed on a TTI basis, from the first transmission. However, in the first transmission, because the reception decision cannot be made before the reception of the entire data ranging over the period of a plurality of TTIs, it may also be possible to perform the decoding processing and the reception decision processing after receiving the entire data over the period of the plurality of TTIs, as conventionally. Here, as shown in the first, the second and the third retransmission processing, by performing the decoding processing and the reception decision processing on a TTI basis even in the first transmission, it is possible to cope with by means of identical processing, without distinguishing between the first transmission processing and the retransmission processing.

Because transmitting-side apparatus 10 recognizes the transmission timing of each TTI data among the data ranging over the period of the plurality of TTIs, transmitting-side apparatus 10 can perform transmission processing without distinguishing the retransmission data from the first transmitted data. Specifically, when transmitting-side apparatus 10 receives an ACK in the period from the lapse of RTT after the transmission of the first TTI data to the lapse of RTT after the transmission of the last TTI data, transmitting-side apparatus 10 completes the transmission (completes the retransmission in the case of retransmission), while when an ACK is not received in the above period, transmitting-side apparatus 10 performs data retransmission processing (re-retransmission processing in the case of retransmission).

The present invention is applicable not only to the hybrid ARQ (H-ARQ) but also to retransmission control in which composition processing is performed on retransmission data on a TTI basis.

To summarize, according to the present invention, when data are transmitted/received over the period of a plurality of processing time units, the receiving side performs reception decision for deciding presence/non-presence of error in the data on the basis of each the processing time unit, and informs the transmitting side of the above reception decision result. Thus, the retransmission processing time is reduced, and efficient retransmission processing is realized.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A mobile communication apparatus receiving and storing data transmitted from an apparatus on a transmitting side over a period of a plurality of processing time units, and at a time of retransmitting the data, having a retransmission control function of performing composition processing of the stored data with the data being retransmitted over the period of a plurality of processing time units, on a basis of each processing time unit, the mobile communication apparatus comprising:

a reception decision circuitry section executing reception decision processing for deciding presence or non-presence of reception error in the entire data transmitted over a plurality of processing time units on which composition processing is performed, based on each processing time unit, wherein, before the completion of the reception of the entire data retransmitted over the plurality of processing time units on which composition processing is performed, the reception decision circuit section decides a normal decision indicative of no reception error; and a transmission circuitry section notifying the apparatus on the transmitting side of the reception decision result based on each processing time unit.

2. The mobile communication apparatus according to claim 1, further comprising:

a measurement circuitry section measuring reception quality of the reception data, wherein the transmission circuitry section notifies the apparatus on the transmitting side of the measurement result.

3. A mobile communication apparatus transmitting data to an apparatus on a receiving side over a period of a plurality of processing time units, and having a retransmission control function of retransmitting the data based on a reception decision result from the apparatus on the receiving side, the mobile communication apparatus comprising:

a reception section receiving the reception decision result for the entire transmitted data transmitted over a plurality of processing time units based on a reception decision result for each processing time unit from the apparatus on the receiving side; and a retransmission control section retransmitting the entire data, when the reception decision results in regard to the entire data are abnormal decisions indicative of a presence of errors, and when the reception section receives a normal decision result, indicative of no reception error, from the apparatus on the receiving side before the completion of data retransmission to be retransmitted over the period of the plurality of processing time units, suspending the retransmission of data after the timing when the normal reception decision result is received.

4. The mobile communication apparatus according to claim 3, wherein the reception section receives, from the apparatus on the receiving side, reception quality in each processing time unit in regard to the data received in the apparatus on the receiving side; and wherein, when retransmitting the data, the retransmission control section transmits each unit data of the plurality of processing time units constituting the data, in order from the lowest reception quality.

5. A mobile communication system comprising:

an apparatus on a receiving side, receiving and storing data transmitted over the period of a plurality of processing time units, and at a time of retransmitting the data, having a retransmission control function of performing composition processing of the stored data with the data being retransmitted over a period of a plurality of processing time units, based on each processing time unit; and an apparatus on a transmitting side, transmitting data to the apparatus on the receiving side over the a period of a plurality of processing time units, and having a retransmission control function of retransmitting the data based on a reception decision result from the apparatus on the receiving side, wherein the apparatus on the receiving side further comprises:

a reception decision circuitry section executing reception decision processing for deciding a presence or non-presence of reception error in the entire data transmitted over a plurality of processing time units on which composition processing is performed, based on each processing time unit; and a transmission circuitry section notifying the apparatus on the transmitting side of the reception decision result, based on each processing time unit, wherein, before the completion of the reception of the entire data retransmitted over the plurality of processing time units on which composition processing is performed, the reception decision circuitry section decides a normal decision indicative of no reception error, and wherein the apparatus on the transmitting side further comprises:

a reception circuitry section receiving the reception decision result for each processing time unit from the apparatus on the receiving side; and a retransmission control circuitry section retransmitting the entire data, when the reception decision results in regard to the entire data are abnormal decisions indicative of the presence of errors, and when the reception section receives a normal decision result, indicative of no reception error, from the apparatus on the receiving side before the completion of data retransmission to be retransmitted over the period of the plurality of processing time units, suspending the retransmission of data after the timing when the normal reception decision result is received.

6. The mobile communication system according to claim 5, wherein the apparatus on the receiving side further comprises:

a measurement circuitry section measuring reception quality of the reception data, wherein the transmission circuitry section notifies the apparatus on the transmitting side of the measurement result.

7. The mobile communication system according to claim 5, wherein the reception circuitry section receives, from the apparatus on the receiving side, reception quality in each processing time unit in regard to the data received in the apparatus on the receiving side; and wherein, when retransmitting the data, the retransmission control circuitry section transmits each unit data of the plurality of processing time units constituting the data, in order from the lowest reception quality.

* * * * *